(12) United States Patent
Olofsson et al.

(10) Patent No.: US 11,391,403 B2
(45) Date of Patent: Jul. 19, 2022

(54) MANUFACTURING METHOD FOR A FLUIDIC ARRANGEMENT AND RELATED FLUIDIC ARRANGEMENT

(71) Applicant: AUTOTUBE AKTIEBOLAG, Varberg (SE)

(72) Inventors: Jan Olofsson, Varberg (SE); Villy Olsson, Mellbystrand (SE)

(73) Assignee: AKWEL SWEDEN AB, Varberg (SE)

( * ) Notice: Subject to any disclaimer, the term of this patent is extended or adjusted under 35 U.S.C. 154(b) by 756 days.

(21) Appl. No.: 15/940,497

(22) Filed: Mar. 29, 2018

(65) Prior Publication Data

US 2018/0283589 A1 Oct. 4, 2018

(30) Foreign Application Priority Data

Mar. 30, 2017 (FR) ...................... 17/52693

(51) Int. Cl.
*F16L 37/088* (2006.01)
*F16L 37/14* (2006.01)

(52) U.S. Cl.
CPC ........... *F16L 37/088* (2013.01); *F16L 37/144* (2013.01)

(58) Field of Classification Search
CPC .............................. F16L 37/088; F16L 37/144
See application file for complete search history.

(56) References Cited

U.S. PATENT DOCUMENTS

| | | | | |
|---|---|---|---|---|
| 4,423,891 A | * | 1/1984 | Menges | F16L 25/0045 285/305 |
| 4,922,738 A | * | 5/1990 | Mori | B21D 53/30 29/894.353 |
| 2005/0136741 A1 | | 6/2005 | Yoshida et al. | |
| 2011/0203677 A1 | * | 8/2011 | Park | F16L 33/2076 137/15.09 |

FOREIGN PATENT DOCUMENTS

| | | | | |
|---|---|---|---|---|
| DE | 102006015555 B3 | * | 1/2007 | .......... F16L 37/0885 |
| DE | 10 2009 038 995 A1 | | 3/2010 | |
| DE | 102010054251 A1 | * | 6/2011 | ............ B60T 17/043 |
| DE | 102018107758 A1 | * | 10/2019 | .............. F16L 33/28 |
| EP | 0753697 A1 | | 1/1997 | |
| EP | 2017520 A2 | | 1/2009 | |
| FR | 2707727 A1 | * | 1/1995 | ............ F16L 37/088 |
| JP | 2010-151258 A | | 7/2010 | |

* cited by examiner

*Primary Examiner* — James M Hewitt, II
(74) *Attorney, Agent, or Firm* — Oliff PLC

(57) ABSTRACT

A method for manufacturing a fluidic arrangement having at least one hose and one male connector with a locking ring configured to cooperate with a female connector, the method is has the following steps of: (a) providing a male connector with a locking ring configured to cooperate with a female connector, (b) providing a metallic hose, (c) mounting the male connector with a locking ring on the hose, (d) enlarging the metallic hose. A fluidic arrangement is made by the manufacturing method.

13 Claims, 5 Drawing Sheets

MANUFACTURING METHOD FOR A FLUIDIC ARRANGEMENT AND RELATED FLUIDIC ARRANGEMENT

TECHNICAL FIELD OF THE INVENTION

The invention relates to a male portion of a quick connector called<<VDA>> for connecting a metallic hose to another component or to another hose.

In the present patent application, "VDA connectors" should be understood as standard connectors recommended by the German Association of the Automotive Industry or "VDA" in German, standing for "Verband der Automobilindustrie", which is a German interest group of the German automotive industry. The VDA quick connectors are used by most pipes manufacturers for transferring fluids in the automotive and trucks market.

BACKGROUND OF THE INVENTION

It is known, in the technical field of quick connectors, to designate by <<VDA>> connector, a fluidic arrangement comprising at least one hose or tube, a male connector with a ring configured to be mounted around the hose and a female connector configured to be mounted on the hose and the male connector, for example by interlocking. In general, the <<VDA>> type connector comprises a mutual locking member including on one hand, a locking recess or groove and on the other hand a locking element such as a metallic spring or metallic clip. Moreover, the male connector with a ring also presents, preferably in this connector type, one or several index marking(s) formed for example by one or several protruding lug(s), two in general disposed diametrically opposite to one another.

In particular, the invention applies to the technical field of fluidic connection in the cooling circuits of the engine and for cooling the batteries or electric or hybrid vehicles. The invention may also be used in other similar systems containing a fluid or a gas using similar<<VDA>> connectors. Most existing<<VDA>> quick connectors are made of plastic and are used to connect hoses made of plastic or flexible hoses made of rubber and comprise a metallic attachment for locking said connector on the hoses and may have orientation lugs for fixing the rotation of the male connector with a locking ring in a correct direction.

Unfortunately, some environments unsuited to plastic elements, for example in high-temperature areas or in some areas which require a certain connection rigidity, for example: on the hot side of the combustion engine or in the proximity of the exhaust system or at locations where the space is limited, a more rigid metallic hose is then preferred rather than a more flexible hose made of rubber or of plastic where its position is less defined. It might be also possible that a more rigid hose is preferred for handling and assembly reasons. Said metallic hoses are often made of aluminum or steel. In order to connect said metallic hoses, a machined metallic end-piece is often brazed or welded on the hose end, which is expensive and generates a risk of leakage in the brazed connections. In addition, the orientation lugs cannot be made by turning and are, consequently, also brazed on the set subsequently, which complicate the manufacture of said male connector.

FEATURES OF THE INVENTION

Considering the foregoing, the aim of the invention is to provide a male connector which is adapted to metallic hoses and which is made without any brazing or welding so as to simplify the manufacturing method, in order to avoid leakages and reduce the manufacturing cost.

To this end, the object of the invention is a method for manufacturing a fluidic arrangement, said fluidic arrangement comprising at least one hose and one male connector with a locking ring configured to cooperate with a female connector, said method is characterized in that it comprises the following steps of:

(a) providing a male connector with a locking ring configured to cooperate with a female connector,
(b) providing a metallic hose,
(c) mounting the male connector with a locking ring on the hose,
(d) enlarging the metallic hose.

The fluidic arrangement of the invention is completely hermetic, the cylindrical sealing surface being created by the enlargement of the hose executed after mounting the male connector with a locking ring on the hose. Indeed, the sealing surface is made by the hose itself; consequently, the attachment of the male connector with a locking ring has not to be necessarily sealed. Thus, the sealing surface made by the enlarged hose eliminates any possible leakage from the brazing junction. In addition, the enlargement of the hose equipped with the male connector with a locking ring allows fixing the male connector with a locking ring both in the axial direction and the direction of rotation. Thus, the male connector with a locking ring is mechanically fixed at the end of the hose during the operation of forming the end.

According to a feature of the invention, said method comprises a step (e) consisting in forming a stop rib on said metallic hose, step (e) being executed before step (c), and when the male connector with a locking ring is placed against the stop rib of the metallic hose at step (c).

Advantageously, the stop rib prevents the male connector with a locking ring from slipping further on the hose during the enlargement of said hose.

According to a feature of the invention, the male connector with a locking ring provided at step (a) is equipped with at least one orientation lug. Alternatively or additionally, the male connector with a locking ring provided at step (a) is equipped with at least one circumferential locking recess arranged at least partially on an outer surface of the male connector with a locking ring, said at least one locking recess being configured to cooperate with a complementary element, such as a metallic spring, equipping the female connector.

According to a feature of the invention, the enlargement of the metallic hose executed at step (d) is performed in at least one slot, preferably several slots which are arranged inside the male connector with a locking ring. This method allows improving the radial and/or axial attachment of the male connector with a locking ring on the hose.

According to a feature of the invention, the mounting step (c) consists in fitting the male connector around the hose.

According to a feature of the invention, step (d) is carried out by cold working of the hose by spinning the material of the hose, in particular into an imprint corresponding to the desired final shape, by pushing on a free end of the hose.

According to a feature of the invention, the resulting deformation of the hose presents a fold forming a locking rib configured to cooperate with a complementary tightening element of the female connector.

According to a feature of the invention, the enlargement of the metallic hose executed at step (d) is carried out at least over a free end portion of the hose, located upstream of an annular area for receiving the male connector, defining, together with an inner wall of the female connector, an annular sealing surface of the fluidic arrangement, the sealing surface defining a location for a sealing element intended to be interposed between the hose and the female connector.

According to a feature of the invention, the method comprises a step (f) which consists in finishing the sealing surface of the fluidic arrangement.

According to a feature of the invention, the method comprises a step (g) which consists in finishing the front radius of the metallic hose of the fluidic arrangement.

According to a feature of the invention, steps (f) and (g) may be executed simultaneously or consecutively, and after step (d) or at the same time as step (d).

According to a feature of the invention, the male connector with a locking ring is integral and is made in one piece.

According to a feature of the invention, the male connector with a locking ring is made of a plastic material or of a metal. For example, the plastic material may be injection-molded and selected, for example, from the polypropylene (PP), polyamide (PA), polyoxymethylene (POM), polyphthalamide (PPA), polyphenylene sulfide (PPS), polysulfone (PSU), polyetheretherketone (PEEK) families, with or without charges such as glass fibers or carbon fibers. For example, the metal may be pressure-molded or forged, and selected, for example, from aluminum, zamak, magnesium or steel.

Another object of the invention is a fluidic arrangement preferably made by the manufacturing method of the invention, said fluidic arrangement comprising at least one metallic hose having a stop rib, at least one male connector with a locking ring configured to cooperate with a female connector, said male connector with a locking ring being arranged on the metallic hose, characterized in that said fluidic arrangement comprises a sealing surface made only by the enlargement of the hose and positioned in front of the male connector with a locking ring on the external portion of the enlarged hose end.

Advantageously, the sealing surface of the fluidic arrangement is configured to be in contact with one or two ring-shaped sealing element(s) of the female connector when the male connector with a locking ring is connected to the female connector.

According to a feature of the invention, the lock is arranged in the areas of a first end of the hose.

According to a feature of the invention, the male connector with a locking ring is placed in a concentric manner on the metallic hose.

According to a feature of the invention, the male connector with a locking ring comprises an outer surface.

According to a feature of the invention, the male connector with a locking ring comprises at least one orientation lug.

According to a feature of the invention, the orientation lug protrudes from the outer surface of the male connector with a locking ring. Advantageously, the orientation lug prevents the rotation of a second hose or flexible hose equipped with the female connector configured to cooperate with the male connector with a locking ring.

Advantageously, the orientation lug is manufactured with the male connector with a locking ring.

According to a feature of the invention, the at least one orientation lug is made of a molded plastic material or of a pressure-molded metal.

According to a feature of the invention, the shape of the orientation lug is adapted to the shape of a complementary element arranged on the female connector configured to cooperate with the male connector with a locking ring.

According to a feature of the invention, the male connector with a locking ring comprises a plurality of orientation lugs arranged on the outer surface of said male connector with a locking ring.

According to a feature of the invention, the male connector with a locking ring comprises at least one slot, preferably several slots arranged on an inner surface of said male connector with a locking ring, the inner surface being configured and shaped so as to tighten the metallic hose.

According to a feature of the invention, the male connector with a locking ring is a male VDA connector configured to cooperate with a female VDA connector or with another female connector equipped with a similar locking mechanism.

According to a feature of the invention, the male connector with a locking ring comprises at least one locking recess configured to cooperate with a complementary element, such as a metallic spring, arranged on the female connector configured to cooperate with the male connector with a locking ring.

According to a feature of the invention, the male connector with a locking ring comprises an orifice, which is a through hole adjusted to the outer diameter of the hose.

According to a feature of the invention, the male connector with a locking ring is a male VDA connector configured to cooperate with a female VDA connector.

According to a feature of the invention, the male connector with a locking ring has a generally annular shape continuous over its entire circumference configured to be fitted around the hose.

According to a feature of the invention, the fluidic arrangement comprises a mutual locking member including a locking recess arranged at least partially on an outer surface of the male connector with a locking ring, said at least one locking recess being configured to cooperate with a complementary locking element, such as a metallic spring, arranged on the female connector configured to cooperate with the male connector with a locking ring.

According to a feature of the invention, the male connector with a locking ring comprises a body with a generally annular shape having a posterior portion with a generally cylindrical shape, a beveled anterior portion and an intermediate portion delimiting a continuous or discontinuous groove forming the locking recess.

According to a feature of the invention, the beveled anterior portion forms a locking rib configured to cooperate with a complementary tightening element of the female connector.

According to a feature of the invention, the male connector with a locking ring comprising an indentation and the hose comprising a locking rib, the locking recess is delimited by walls of the indentation and a face of the locking rib.

According to a feature of the invention, the connector with a locking ring comprises at least one slot and the metallic hose comprises on its wall a deformation conforming to the shape of the slot to immobilize in relative rotation the male connector and the metallic hose.

BRIEF DESCRIPTION OF THE FIGURES

The invention will be better understood thanks to the specification detailed hereinafter, which describes several embodiments of the invention as example and based on the following figures.

DETAILED DESCRIPTION OF THE INVENTION

Regardless of the embodiment of the fluidic arrangement 1, the fluidic arrangement 1 comprises a hose 2 which extends according to a longitudinal axis X-X and which has a first end portion 2a. In this example, the hose 2 comprises a body with a general revolution shape around the axis X-X. In the present description, the first end portion 2a is ended by a free end of the hose 2.

Figure 11:
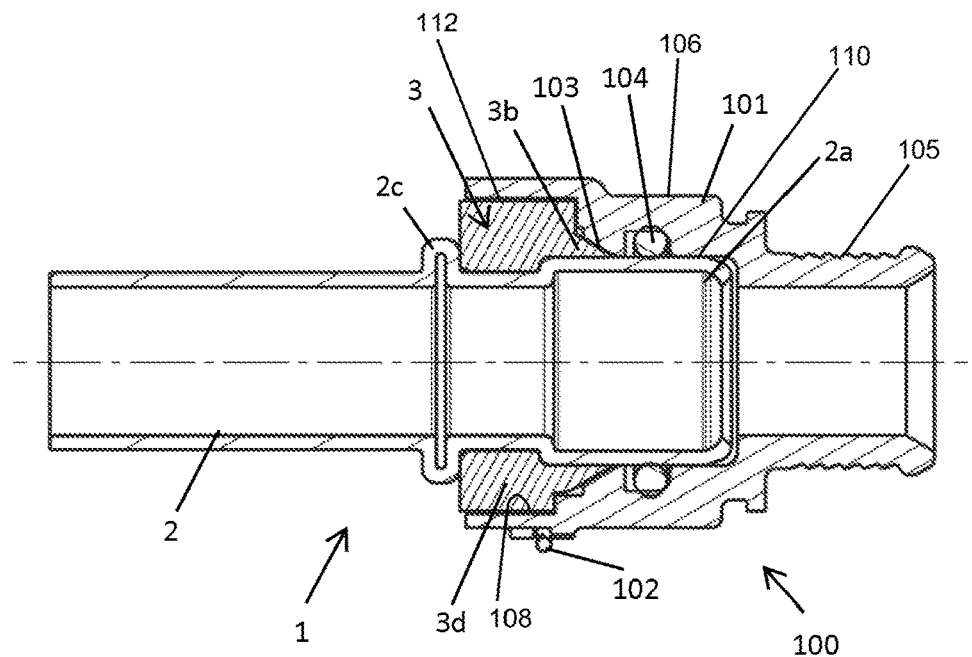
FIG. 11 is a cross-sectional view of a fluidic set comprising a fluidic arrangement according to the second embodiment of the invention connected to a female VDA connector.
Figure 12:
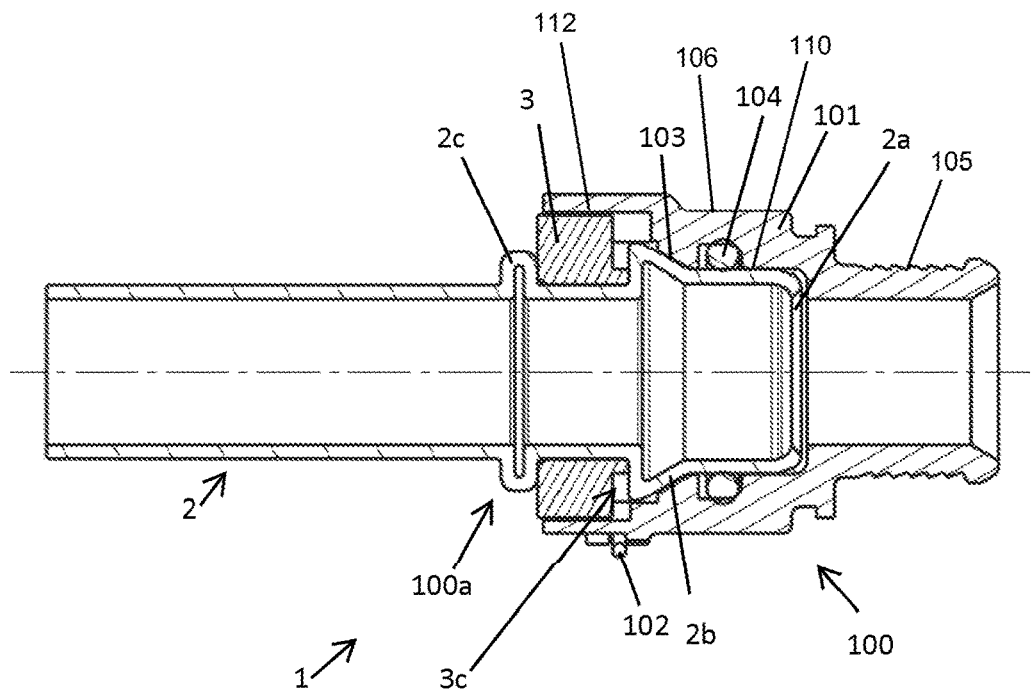
FIG. 12 is a cross-sectional view of a fluidic set comprising a fluidic arrangement according to the first embodiment of the invention connected to a female VDA connector.

The fluidic arrangement 1 further comprises a male connector with a locking ring 3 configured to cooperate with a female connector 100 represented in FIGS. 11 and 12 representing two different embodiments of the fluidic arrangement 1. The male connector with a locking ring 3 comprises an annular body having a longitudinal central axis.

Preferably, the male connector with a locking ring 3 is made of a plastic material or of a metal. For example, the plastic material may be injection-molded and selected, for example, from the polypropylene (PP), polyamide (PA), polyoxymethylene (POM), polyphthalamide (PPA), polyphenylene sulfide (PPS), polysulfone (PSU), polyetheretherketone (PEEK) families, with or without charges such as glass fibers or carbon fibers. For example, the metal may be pressure-molded or forged, and selected, for example, from aluminum, zamak, magnesium or steel. Preferably, regardless of the embodiment, the male connector 3 is formed by an uninterrupted continuous ring. Alternatively, the male connector may be formed by a split ring.

Advantageously and as illustrated in particular in FIGS. 1 to 3, 6, 7, 10 and regardless of the embodiment, the male connector with a locking ring 3 is placed in a concentric manner on the metallic hose 2 and comprises an orifice 3a, which is a through hole adjusted to the outer diameter of the hose 2. Preferably, the male connector with a locking ring 3 is mounted by fitting the male connector 3 around the hose 2.

As illustrated in the figures of the invention, FIGS. 1 to 10, the male connector with a locking ring 3 comprises an outer surface on which orientation lugs 4 are arranged. Preferably, two orientation lugs 4 are arranged in a diametrically symmetrical manner on said outer surface of the male connector with a locking ring 3. The orientation lugs 4 protrude from the outer surface of the male connector with a locking ring 3 and are configured to cooperate with a complementary element equipping the female connector configured to cooperate with the male connector with a locking ring 3. Advantageously, the shape of the orientation lugs 4 is adapted to the shape of a complementary element.

In a non-illustrated variant, the orientation lugs 4 are not necessary and at least one circumferential locking recess 3c is required to cooperate with the female connector, said circumferential locking recess 3c being arranged all around the circumference of said male connector with a locking ring 3, in order to cooperate with a spring of the female connector which may be in any position all around the female connector.

Regardless of the embodiment of the fluidic arrangement 1, the male connector with a locking ring 3 is a male<<VDA>> type quick connector configured to cooperate with a female<<VDA>> type quick connector.

In the context of the present invention, by <<VDA>> quick connector, is meant a fluidic arrangement set comprising at least one tube or hose, a male connector with a ring capable of being mounted on an end portion of the tube, a female connector configured to be mounted on the tube and the male connector and a mutual locking member of the two male and female connectors. In general, this mutual locking member comprises at least one locking recess or groove and a complementary locking element configured to cooperate with the recess. For example, the locking element is a metallic spring or a metallic clip arranged on the female connector. Furthermore, in general, this type of connector further comprises a sealing element capable of being interposed between the female connector and the hose. It should be also noted that the male<<VDA>> type connector may include an index marking formed for example by a lug protruding on the outer surface of the male connector with a ring.

Regardless of the embodiment of the fluidic arrangement 1, the hose 2 comprises an enlargement of the external diameter at least on its free end portion 2a, located upstream of an annular area for receiving the male connector 3. This free end portion 2a defines, together with an inner wall of the female connector 100, an annular sealing surface of the fluidic arrangement 1. The sealing surface defines a location for a sealing element 104 intended to be interposed between the hose 2 and the female connector 100.

Regardless of the embodiment of the fluidic arrangement 1, the male connector with a locking ring 3 comprises at least one locking recess 3c configured to cooperate with a complementary element 102, such as a metallic spring, arranged on the female connector configured to cooperate with the male connector with a locking ring 3. The locking recess 3c is formed at least partially by the outer surface of the male connector with a locking ring 3. The locking recess 3c and the complementary element 102 form together a mutual locking member of the fluidic arrangement.

Figure 5:
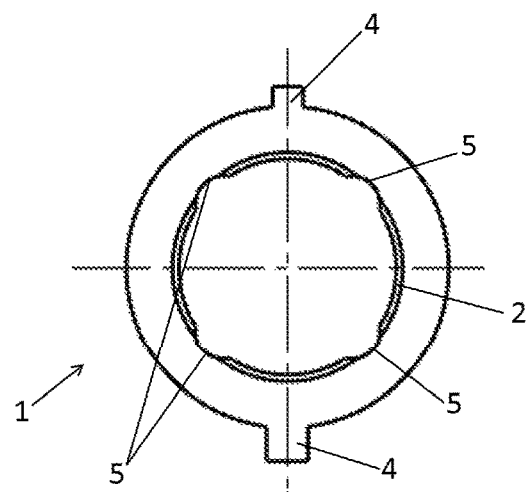
FIG. 5 is a top view of the male connector with a locking ring illustrated in FIG. 4 of the fluidic arrangement illustrated in FIG. 1 according to the first embodiment of the invention.
Figure 9:
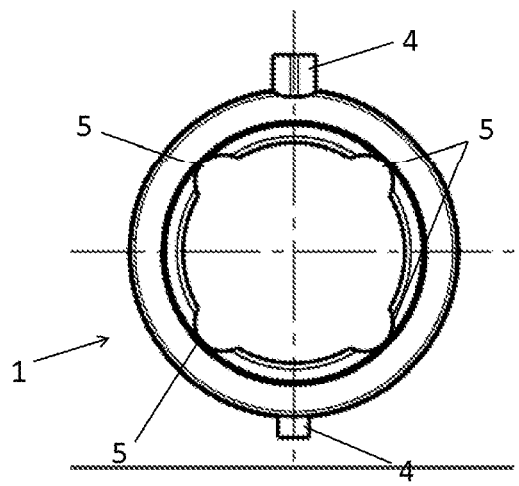
FIG. 9 is a top view of the male connector with a locking ring illustrated in FIG. 8 of the fluidic arrangement illustrated in FIG. 6 according to the second embodiment of the invention.
Figure 10:
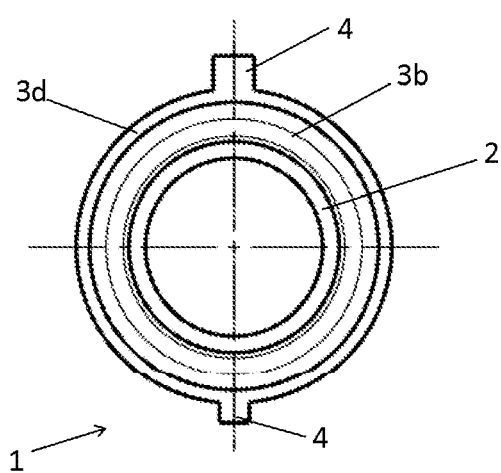
FIG. 10 is a top view of the fluidic arrangement illustrated in FIG. 6 according to the second embodiment of the invention.

According to a feature of the invention and as illustrated in FIGS. 5 and 9, the male connector with a locking ring 3 comprises several slots or notches 5 arranged on an inner surface of said male connector with a locking ring 3, the inner surface being configured and formed so as to tighten the metallic hose 2. In the described example, the male connector comprises four notches or slots 5 evenly spaced inside the inner surface. These slots 5 form imprints inside which the material of the wall of the metallic hose 2 is intended to be deformed by means of a tool predefined to conform to the shape of the slots 5. For example, the tool may comprise a plurality of pins or corrugations configured to locally enlarge the wall of the metallic hose 2 by conforming to the imprints formed by the slots 5.

Figure 1:
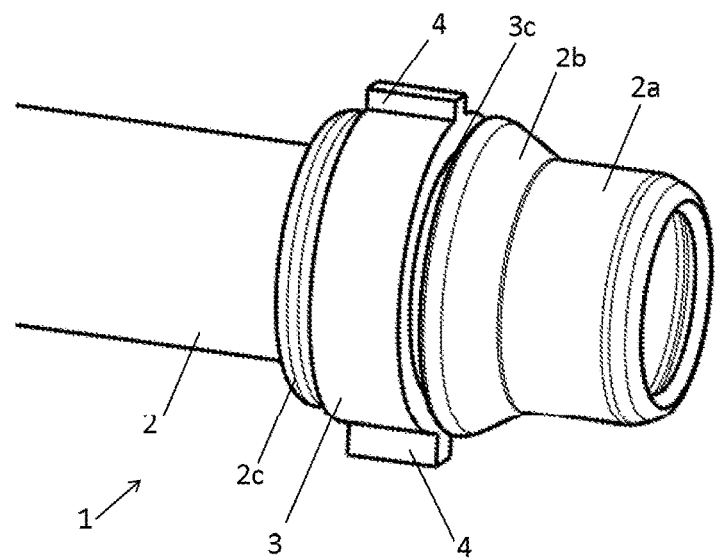
FIG. 1 is a perspective view of a fluidic arrangement according to a first embodiment of the invention.
Figure 2:
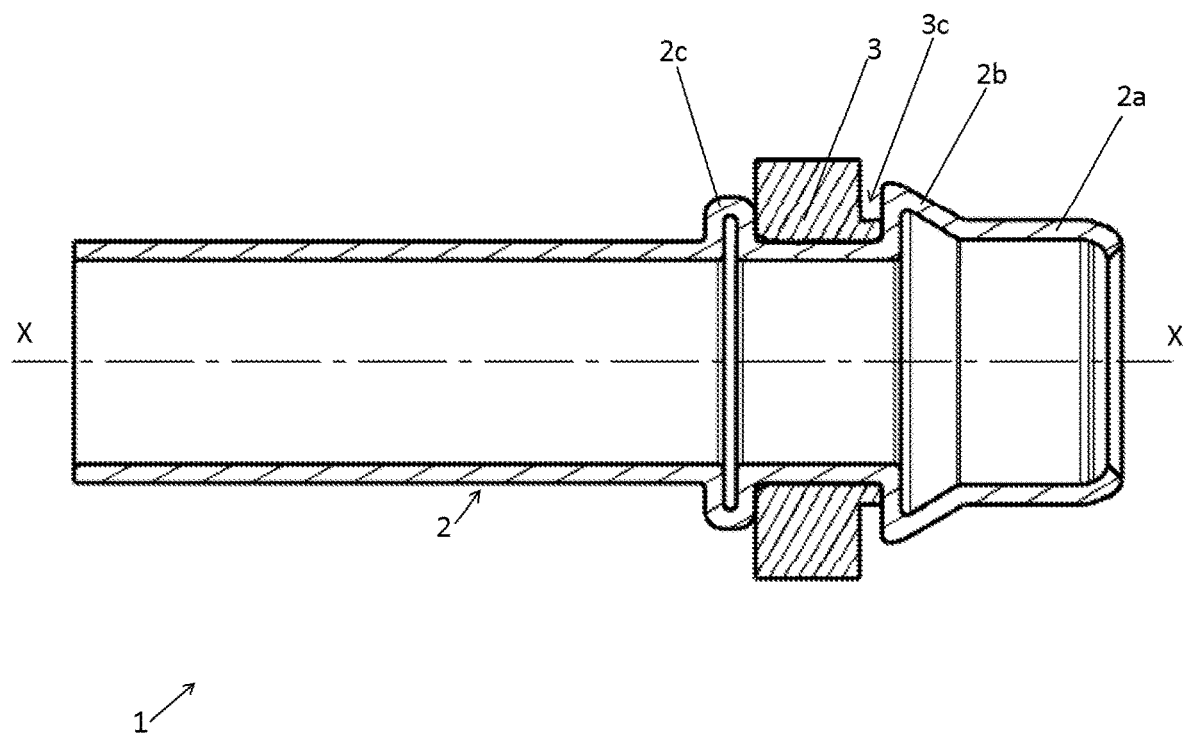
FIG. 2 is a cross-sectional view of the fluidic arrangement illustrated in FIG. 1 according to the first embodiment of the invention.
Figure 3:
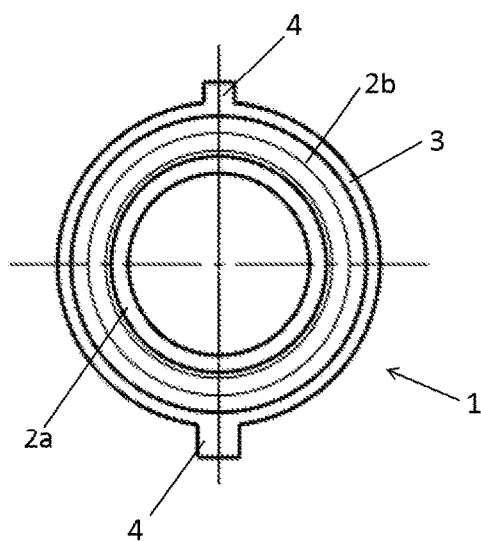
FIG. 3 is a top view of the fluidic arrangement illustrated in FIG. 1 according to the first embodiment of the invention.
Figure 4:
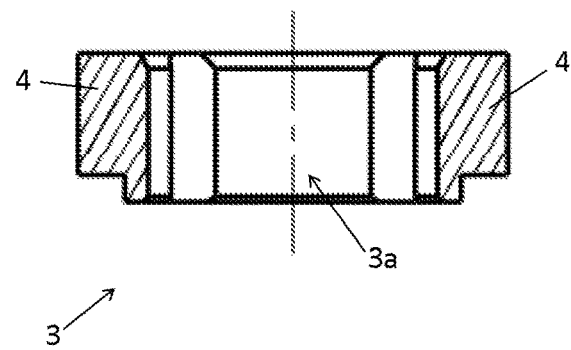
FIG. 4 is a cross-sectional view of the male connector with a locking ring of the fluidic arrangement illustrated in FIG. 1 according to the first embodiment of the invention.

This results in a plurality of protruding reliefs (not shown in the figures) at the outer surface of the hose 2 at the level of the area for receiving the male connector 3. This operation of deforming the hose 2 inside the slots 5 aims at immobilizing in rotation the hose 2 and the locking ring 3. Furthermore, preferably, regardless of the embodiment, the metallic hose 2 comprises a stop rib 2c preferably formed before mounting the male connector with a locking ring 3 on the metallic hose 2 as illustrated in FIG. 2. Thus, the metallic hose 2 comprises an annular ridge forming the stop rib 2c intended to prevent the displacement of the connector 3 along the hose 2 beyond this rib 2c.

The first embodiment of the fluidic arrangement according to the invention will now be described in detail with reference to FIGS. 1 to 5 and 12.

In the first embodiment illustrated by FIGS. 1 to 5, the hose 2 comprises a lock 2b arranged at the first end 2a of the hose 2. This lock 2b serves in immobilizing in translation the ring connector 3 along the hose 2. Thus, in this first embodiment, the hose 2 presents over its outer periphery a circumferential rib forming the lock 2b, shown in particular in FIGS. 1 and 2. Preferably, this lock 2b is beveled and is formed by a beveled locking rib 2b. In particular, the advantage of providing a beveled lock 2b is to facilitate the elastic deformation of the metallic clip or spring 102 during the assembly of the female connector 100 on the hose 2 and the male connector 3.

Thus, as shown in FIG. 2, the hose 2 presents a circumferential deformation in the form of a fold having a face turned toward the free end 2a with a generally truncated-cone shape and an opposite face extending radially. Preferably, this locking fold 2b is formed by cold working after mounting the male connector 3 around the metallic hose 2.

As shown in FIG. 2, the above-described annular ridge 2c and the circumferential rib 2b delimit an annular groove defining an annular location for receiving the locking male connector 3.

According to the first embodiment, the male connector 3 further comprises an annular locking recess 3c partially arranged on the outer surface of the male connector with a locking ring 3. In particular, as illustrated in detail in FIG. 4, the male connector 3 presents an annular indentation to delimit, together with a face of the lock 2b, the locking recess 3c. Thus, in this first embodiment, the locking recess 3c is partially formed by the lock 2b of the metallic hose 2 and partially by the male connector with a locking ring 3. In this example, the locking recess 3c forms a circumferential slot. In a non-illustrated variant, the locking recess 3c can be positioned only there where it is needed for locking a spring made of steel and arranged on the female connector.

As illustrated in FIG. 12, the male connector with a locking ring 3 is intended to be attached to the female<<VDA>> connector 100. Conventionally, the female<<VDA>> connector 100 comprises a female locking case 101. The female case 101 comprises a body extended by a tubular portion 105 capable of being connected for example to a flexible hose (not represented in the figures). To this end, as illustrated in FIG. 12, the tubular portion 105 comprises for example a corrugated profile.

The female connector 100 is externally delimited by a cylindrical wall 106 which is connected to the tubular portion by a shoulder. Furthermore, the female connector 100 internally delimits a housing 108 arranged to receive the end of the hose 2 as well as the ring connector 3 fitted beforehand on the hose 2.

Preferably, the housing 108 of the female connector is delimited by an inner first cylindrical wall portion 110 with a diameter substantially equal to that of the portion 2a of the end of the hose 2. Preferably, this first wall portion 110 forms a surface for bearing against the end wall 2a of the hose 2 to create an annular sealing surface of the fluidic arrangement 1. This first portion 110 of the female connector 100 comprises an annular groove capable of receiving a sealing element 104 such as an O-ring gasket.

Preferably, the female connector 100 comprises a tightening element 103 intended to come into contact with the locking rib 2b of the male connector 3. In the described example, the tightening element 103 is formed by a frustum shaped wall, which is connected on the one hand to the first sealing portion 110 and on the other hand to a second portion of the cylindrical wall 112 opening outwardly.

In this example, the beveled locking rib 2b of the male connector is in contact with a beveled complementary surface of the tightening element 103 of the female<<VDA>> connector 100.

In addition, the first end 2a of the hose 2 of the fluidic arrangement 1 passes through the tightening element 103 and rests against a sealing element 104 of the female<<VDA>> connector 100.

Furthermore, the fluidic arrangement 1 preferably comprises a locking member intended to immobilize the female case 103 with respect to the male connector after their mutual interlocking. For example, the locking member 102 comprises a locking element 102 and a locking recess 3c.

Finally, the locking recess 3c (not shown in the figure) cooperates with a metallic locking spring 102 of the female<<VDA>> connector 100, in order to lock together the female<<VDA>> connector 100 and the male connector with a locking ring 3.

Furthermore, in this first embodiment, as shown in FIG. 12, the annular sealing surface of the fluidic arrangement 1 is located upstream of the lock 2b.

The second embodiment of the fluidic arrangement 1 according to the invention will now be described with reference to FIGS. 6 to 11. In this second embodiment, the elements similar to the first embodiment carry identical references.

The male connector with a locking ring 3 of this second embodiment is illustrated in detail in FIGS. 7 to 10.

Figure 8:
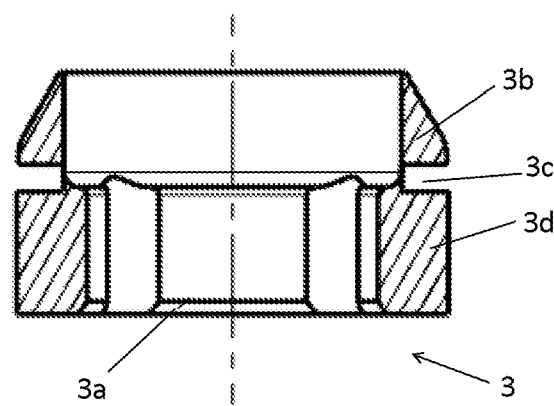
FIG. 8 is a cross-sectional view of the male connector with a locking ring of the fluidic arrangement illustrated in FIG. 6 according to the second embodiment of the invention.

Preferably, as illustrated in FIG. 8, the male connector 3 has a generally annular shape around a longitudinal axis. The male connector 3 comprises a ring body externally delimited by a truncated-cone shaped anterior wall 3b and by a cylindrical posterior wall 3d, in which is formed an annular groove 3c extending over all or part of the circumference of the outer surface of the male connector with a locking ring 3.

Figure 7:
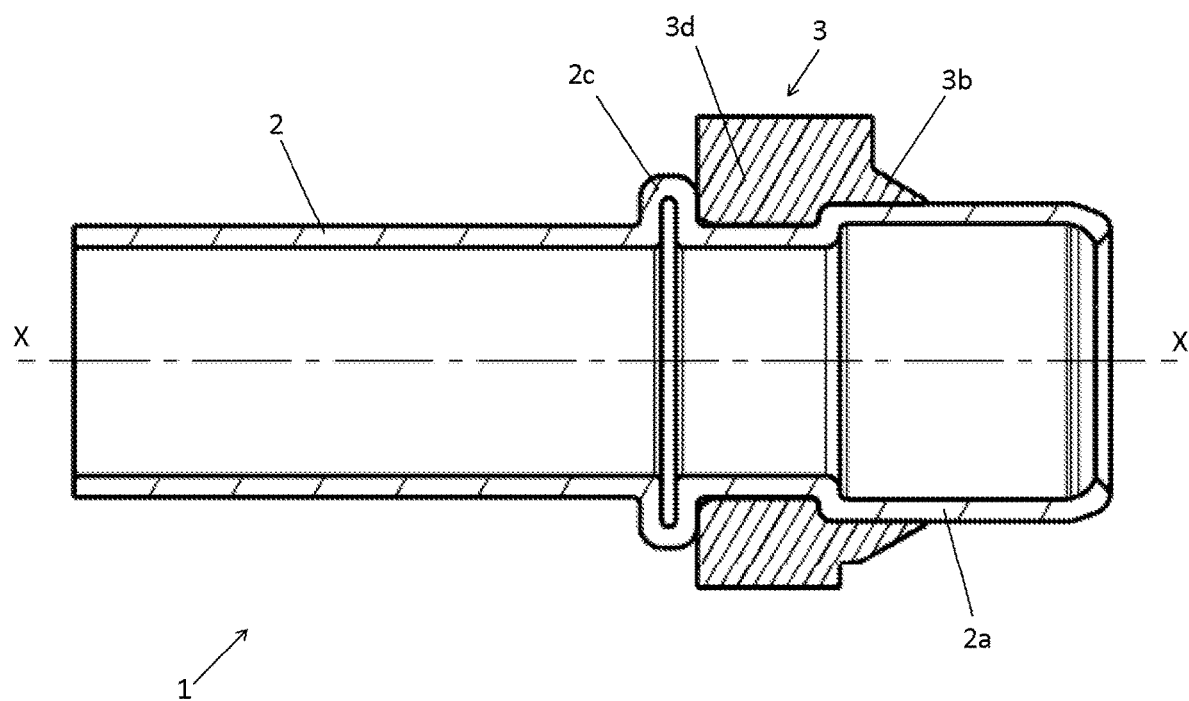
FIG. 7 is a cross-sectional view of the fluidic arrangement illustrated in FIG. 6 according to the second embodiment of the invention.

The male connector 3 comprises a locking rib 3b, which is preferably beveled and extends on the metallic hose 2 and around the latter. In this example, this locking rib 3b is formed by the truncated-cone shaped anterior wall 10. As in the first embodiment, the metallic hose 2 comprises a stop rib 2c formed before mounting the male connector with a locking ring 3 on the metallic hose 2 as shown in FIG. 7.

According to the second embodiment, the locking recess 3c is partially arranged on the outer surface of the male connector with a locking ring 3.

Figure 6:
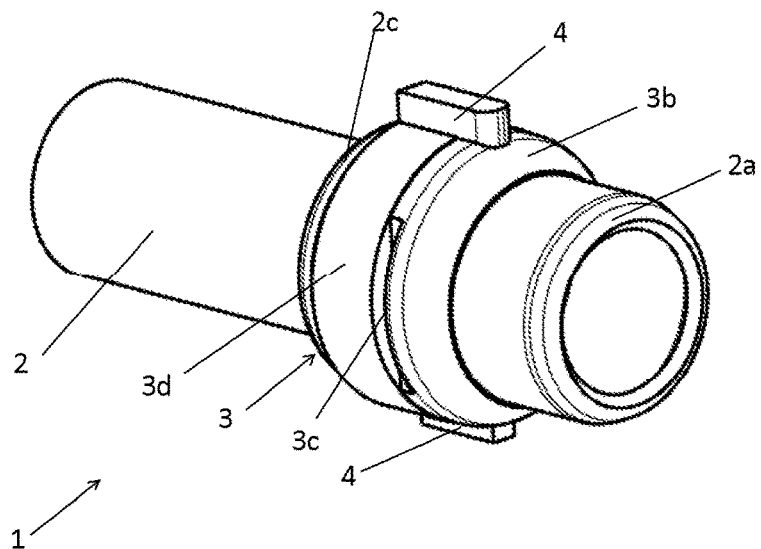
FIG. 6 is a perspective view of a fluidic arrangement according to a second embodiment of the invention.

Thus, as illustrated in FIG. 6, the locking recess 3c does not extend over the entire circumference of the outer surface of the male connector with a locking ring 3. In a non-illustrated variant, the recess 3c may extend all around the outer surface of the male connector with a locking ring 3. The locking recess 3c is formed between the locking rib 3b and a body 3d of the male connector with a locking ring.

As illustrated in FIG. 11, the male connector with a locking ring 3 is attached to the female<<VDA>> connector 100 comprising a female locking case 101. More specifically, the beveled locking rib 3b is in contact with a beveled complementary surface of a tightening element 103 of the female<<VDA>> connector 100. In addition, the first end 2a of the hose 2 of the fluidic arrangement 1 passes through the tightening element 103 and rests against a sealing element 104 of the female<<VDA>> connector 100. Finally, the locking recess 3c (not shown in the figure) cooperates with a metallic locking spring 102 of the female<<VDA>> connector 100, in order to lock together the female<<VDA>> connector 100 and the male connector with a locking ring 3.

As also shown in FIG. 11, in this second embodiment, the annular sealing surface is located in a flared portion of the hose 2. Furthermore, in this second embodiment, the ring connector 3 also extends partially around the flared portion.

The main steps of a method for manufacturing a fluidic arrangement according to the first and second embodiments and the main operating aspects of the fluidic arrangement obtained accordingly will now be described with reference to the figures.

Initially, before its assembly, the fluidic arrangement 1 comprises a hose 2, a male connector with a locking ring 3 and a female connector 100 and preferably a mutual locking member and a sealing element 104.

During a first step of shaping the end portion 2d of the hose 2, a ridge 2c is formed on the hose 2 at a distance from its free end 2a.

During a second assembly step, the male connector is mounted on the hose, preferably by fitting and sliding around the hose 2 from the free end 2a until abutting against the stop rib 2c.

In accordance with the invention, the method comprises a step of enlarging the hose 2. Like the first step of forming the ridge 2c, this enlargement step is carried out for example by cold working of the hose 2 by spinning material through successive pushing operations. Thus, it is known to place the end portion of the hose to be deformed in a die presenting an imprint corresponding to the final external shape of the hose and to push on the free end 2a of the hose 2 in order to deform the wall of the latter and push the material forming the hose into the imprint of the die.

The accuracy on the enlarged external diameter is about one-tenth of a millimeter, which is enough for guaranteeing sealing with an O-ring gasket.

Furthermore, the deformation of the enlarged "sealing" diameter may be obtained within a proportion of +5% to +50% of the diameter of the hose 2 before deformation.

In the first embodiment of a fluidic arrangement illustrated in FIG. 2, the enlargement step comprises a step of forming a fold forming the lock 2b allowing retaining the ring connector 3 according to the longitudinal direction between the lock 2b and the stop rib 2c. Preferably, this fold has a truncated-cone shaped face to facilitate the subsequent press fitting of the mutual locking member.

In the second embodiment of a fluidic arrangement illustrated in FIG. 7, the enlargement step consists in flaring the hose 2 in its end portion 2a by forming an end portion with an enlarged section, the section change being delimited by a shoulder. Optionally, the ring connector 3 may be provided on its inner wall with a plurality of slots 5. In this case, the method further comprises a step of locally enlarging the hose 2. Thus, the hose 2 is enlarged in the area for receiving the male connector 3 by a tool presenting as many pins as the ring connector 3 has notches 5. Thus, we proceed to a local enlargement in each of the notches or slots 5 of the hose 2 by cold working of the wall of the metallic hose 2. Once these steps completed, the tube formed accordingly and equipped with the ring 3 can then be connected to a female connector 100, the sealing element 104 ensuring sealing of the fluid circulating inside the pipe by bearing on the previously enlarged end portion 2a of the hose 2.

The advantage of the male connector manufactured according to the method of the invention, formed in the example with plastic (or metallic) orientation lugs and a locking ring, mainly consists in the reduction of the costs of the final part, but also in improving sealing thanks to the reduction of the potential leakage point at the level of the weld or the spacer of the metallic male<<VDA>> connector. With the proposed design, the sealing surface is formed by the hose itself and the metallic or plastic ring only serves in retaining the female quick connector and also in fixing the orientation of rotation of the latter so that the female quick connector with its plastic tube or its rubber hose points at the intended direction. Another advantage of the method of the invention is that the connection can be performed on a hose made of aluminum or of pre-coated steel, which reduces the cost of protection against corrosion.

Of course, the invention is not limited to the embodiments described and represented with the appended figures. Modifications are still possible, in particular as regards the constitution of each element or by substitution of technical equivalents, yet without departing from the scope of the invention.

The invention claimed is:

1. A method for manufacturing a fluidic arrangement, the fluidic arrangement comprising at least one hose and one male connector configured to cooperate with a female connector, the method comprises the following steps of:
   (a) providing a male connector configured to cooperate with a female connector comprising a tightening element and a locking element, the male connector comprising a locking ring, the locking ring comprising an outer surface and an indentation at least partially formed by the outer surface,
   (b) providing a metallic hose, the metallic hose comprising at least one free end and one end portion adjacent to the free end,
   (c) forming a stop rib on the metallic hose at the end portion thereof,
   (d) mounting the locking ring of the male connector on the metallic hose from the free end of the metallic hose until the locking ring is placed against the stop rib of the metallic hose, and
   (e) enlarging the metallic hose so as to form a fold on the end portion, the fold retaining the locking ring against the stop rib, enlargement of the metallic hose being executed after mounting the locking ring on the metallic hose, the fold being configured as a locking rib capable to cooperate with the tightening element of the female connector, the locking rib and the indentation forming in conjunction with each other a locking recess, the locking recess being capable to cooperate with the locking element of the female element to form a mutual locking member.

2. The manufacturing method according to claim 1, wherein mounting the locking ring of the male connector on the metallic hose comprises fitting the locking ring of the male connector around the metallic hose.

3. The manufacturing method according to claim 1, wherein step (e) is carried out by cold working of the metallic hose by spinning the material of the metallic hose.

4. The manufacturing method according to claim 1, wherein the enlargement of the metallic hose executed at step (e) is carried out at least over the end portion of the metallic hose, located upstream of an annular area for receiving the locking ring of the male connector, defining, together with an inner wall of the female connector, an annular sealing surface of the fluidic arrangement, the sealing surface defining a location for a sealing element intended to be interposed between the metallic hose and the female connector.

5. The manufacturing method according to claim 1, wherein step (a) comprises providing the male connector with at least one slot inside the locking ring of the male connector, and step (e) comprises enlarging the metallic hose facing said at least one slot.

6. The manufacturing method according to claim 1, wherein the locking ring of the male connector is made of a molded plastic material or of a pressure-molded metal.

7. The manufacturing method according to claim 1, wherein the locking ring of the male connector comprises on its outer surface at least one orientation lug made of a molded plastic material or of a pressure-molded metal.

8. A fluidic arrangement made by the manufacturing method according to claim 1, the fluidic arrangement comprising the at least one metallic hose having the stop rib, the male connector configured to cooperate with the female connector, the male connector comprising the locking ring, the locking ring being arranged on the metallic hose, wherein the fluidic arrangement comprises a sealing surface made only by the enlargement of the metallic hose and positioned in front of the locking ring on the external portion of the enlarged metallic hose end and the male connector is monobloc and made in one single piece.

9. The fluidic arrangement according to claim 8, wherein the locking ring comprises an outer surface on which is arranged at least one orientation lug.

10. The fluidic arrangement according to claim 8, wherein the locking ring has a generally annular shape continuous over its entire circumference configured to be fitted around the metallic hose.

11. The fluidic arrangement according to claim 8, wherein the locking ring of the male connector comprises a body with a generally annular shape having a posterior portion with a generally cylindrical shape, a beveled anterior portion and an intermediate portion delimiting a continuous or discontinuous groove forming the locking recess.

12. The fluidic arrangement according to claim 11, wherein the beveled anterior portion forms a locking rib configured to cooperate with the tightening element of the female connector.

13. The fluidic arrangement according to claim 8, wherein the locking ring of the male connector comprises at least one slot and the metallic hose comprises on its wall a deformation conforming to the shape of the slot to immobilize in relative rotation the male connector and the metallic hose.

* * * * *